H. WILSON.
DIRECTION INDICATOR.
APPLICATION FILED AUG. 9, 1919.
1,326,316.
Patented Dec. 30, 1919.
2 SHEETS—SHEET 1.
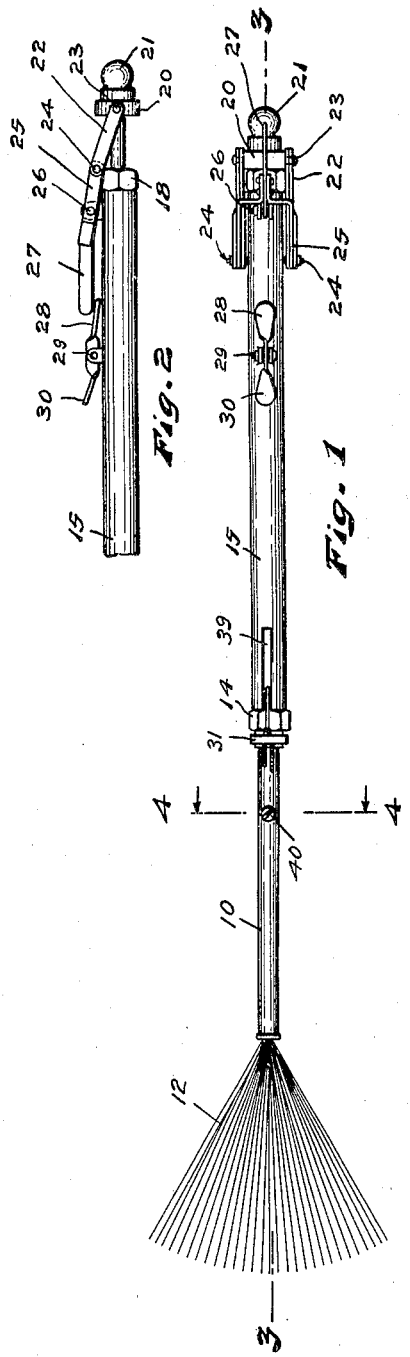
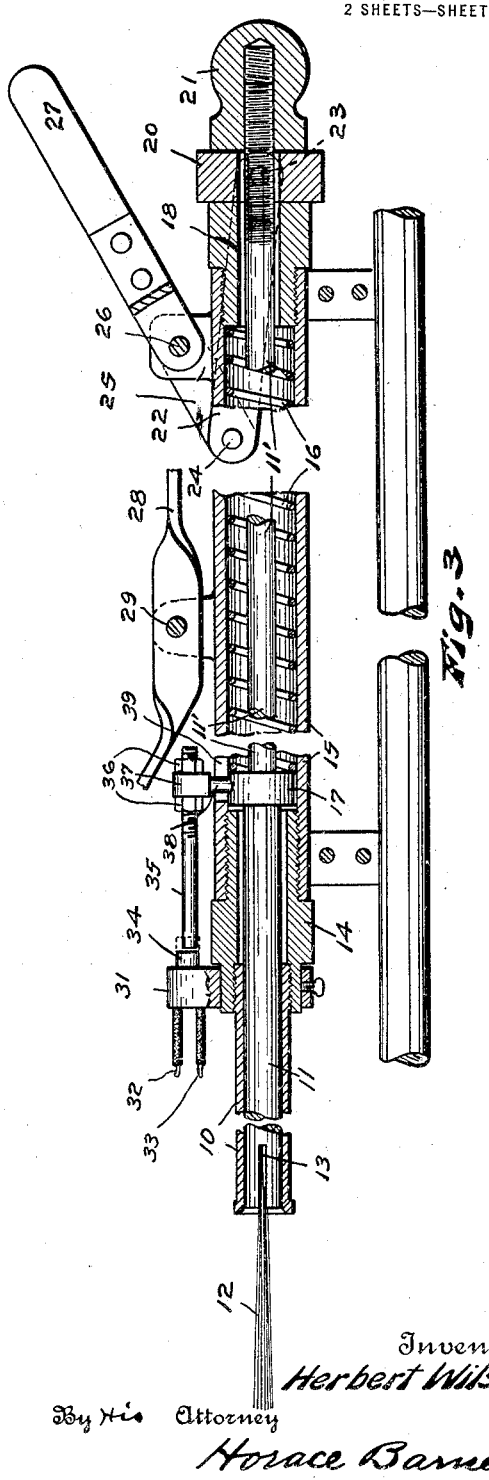
Inventor
Herbert Wilson
By His Attorney
Horace Barnes H. WILSON.
DIRECTION INDICATOR.
APPLICATION FILED AUG. 9, 1919.
1,326,316.
Patented Dec. 30, 1919.
2 SHEETS—SHEET 2.
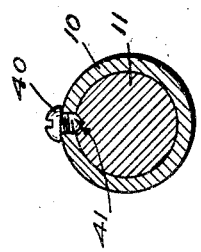
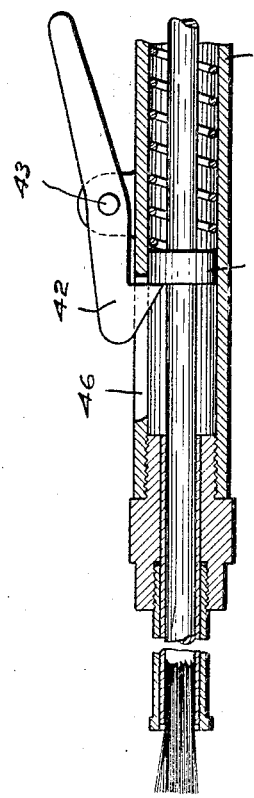
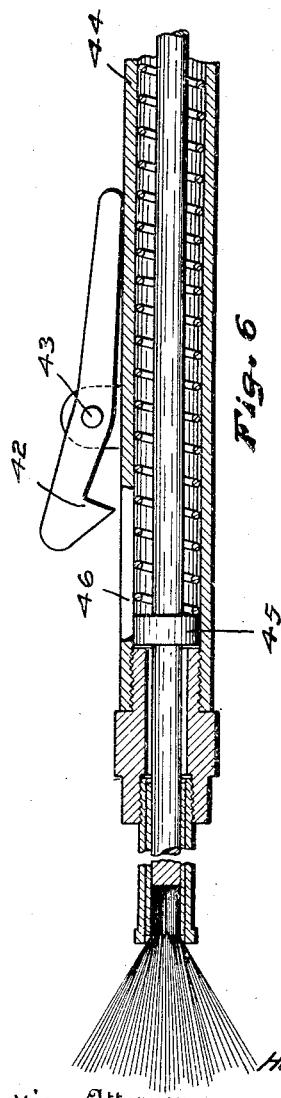
Inventor
Herbert Wilson
By His Attorney
Horace Barnes

UNITED STATES PATENT OFFICE.

HERBERT WILSON, OF SEATTLE, WASHINGTON.

DIRECTION-INDICATOR.

1,326,316. Specification of Letters Patent. Patented Dec. 30, 1919.

Application filed August 9, 1919. Serial No. 316,502.

*To all whom it may concern:*

Be it known that I, HERBERT WILSON, a citizen of the United States, residing at Seattle, in the county of King and State of Washington, have invented a certain new and useful Improvement in Direction-Indicators, of which the following is a specification.

This invention relates to improvements in direction indicators for motor vehicles and the object of this improvement is to provide simple and convenient means by which the driver of a motor vehicle may indicate to other persons, either in front of, or behind his vehicle, his intention to turn to one side or the other.

A further and more specific object is to provide a direction indicator having a signaling device formed of a plurality of spring wires that are arranged to be drawn into a tube when not in use and to be moved out of such tube and permitted to spread out in the shape of a fan when they are in a signaling position.

A still further object is to provide simple and efficient mechanism by which the fan shaped signaling device may be quickly and easily withdrawn into the tube, and held in a position where it is not visible the said withdrawal mechanism operating against the pressure of a spring and being arranged to be tripped by a relatively light pressure to permit the signal to be displayed.

The invention consists in the novel construction, adaptation and combination of parts of a direction indicator for motor vehicles as will be more clearly hereinafter described and claimed.

In the accompanying drawings Figure 1 is a plan view of a direction indicator constructed in accordance with this invention; Fig. 2 is a fragmentary view in side elevation of the same; Fig. 3 is a view in cross section substantially on broken line 3, 3 of Fig. 1, certain parts being broken away; Fig. 4 is an enlarged view in cross section on broken line 4 4 of Fig. 1; Fig. 5 is a fragmentary sectional view illustrating a modified form of the device and Fig. 6 is a view similar to Fig. 5 except that the parts are shown in a different position.

Like reference numerals designate like parts throughout the several views.

Referring to the drawings the numeral 10 designates a tube within which is a slidably mounted rod 11 that is connected at its outer end with a semaphore or signaling member 12 that is formed of a plurality of wires of spring metal that may be inserted within a slot 13 in the end of the rod 11 and soldered or brazed therein as shown in Fig. 3 the wires being bent so that when they are not restrained they will spread out into substantially the shape of a fan.

When the semaphore 12 is completely out of the tube 10 the wires will spread out in the shape of a fan, as shown in Fig. 1 thereby presenting to view a broad surface and one that is easily seen, but when the semaphore 12 is withdrawn into the tube 10 the wires thereof will be sprung together as shown in Fig. 5 so that they can not be easily seen.

The tube 10 is connected by a coupling 14 with a larger tube 15 within which is provided a compression spring 16 that is interposed between a collar 17 on a rod 11' and a plug 18 in the end of the larger tube 15 so that it will urge the rod 11' to the left as viewed in Fig. 3.

The rod 11' is securely screwed into the end of the rod 11 so that the two rods are in effect one and the same piece and such rod 11' is arranged to project outwardly throughout the plug 18 and is provided with a loosely mounted collar 20 and with a knob 21 that is arranged to screw onto the end of the rod.

The rods 11 and 11' are moved lengthwise within the tubes 10 and 15 by links 22 that are connected at one end by pivots 23 with the collar 20 and at the other end by pivots 24 with the ends 25 of a forked lever arm that is fulcrumed on a pivot 26 and provided with a handle element 27.

When the handle element 27 is moved from the position shown in Figs. 1 and 3 to the position shown in Fig. 2 the rod 11 will be moved to the right and the semaphore 12 will be withdrawn into the end of the tube 10 thus folding such semaphore so that it is not easily visible. As the lever arm 27 approaches the position shown in Fig. 2 the pivot 24 will pass the line of centers of the pivots 23 and 26 a short distance thereby forming a lock that prevents the several links and levers from snapping back into the position shown in Fig. 1.

When the handle member 27 is in the position shown in Fig. 2 its end will rest lightly on the end of a trip lever 28 that is fulcrumed as at 29 and is provided with a finger piece 30 that may be pressed lightly to trip the link and lever mechanism and permit the semaphore 12 to be snapped outwardly by the spring 16 and displayed to view.

The coupling 14 may have a switch box 31 secured thereto within which switch box may be provided a suitable switch that is connected with circuit wires 32 and 33 and has a spring actuated push button 34 projecting from one side thereof that is arranged to be engaged by a bar 35 and moved from the position shown by dotted lines to the position shown by full lines in Fig. 3 to close the switch when the semaphore is moved from the retracted to the signaling position. The bar 35 is adjustably secured by nuts 36 to a head 37 on the end of a stud 38 that passes through a slot 39 in the wall of the tube 15 and screws into the collar 17.

The wires 32 and 33 may be connected with a lamp that is arranged in any suitable location so that it will illuminate the semaphore 12 when the latter is extended. Obviously the lamp will only be needed at night since the wires of the semaphore will be painted or colored brightly so that it may be readily seen in the day light.

The rod 11 is prevented from turning in the tube 10 by a screw 40 that is screwed through such tube and projects into a longitudinally extending groove 41 in the rod as more clearly shown in Fig. 4.

In Figs. 5 and 6 I have shown a hook 42 that is fulcrumed as at 43 on a tube 44 that corresponds to the tube 15 and is arranged to engage with a collar 45 that is identical with the collar 17. The tube 44 is provided with a slot 46 through which the hook 42 operates and the outer end of the hook terminates in a relatively long arm 47 that may be engaged by the hand to release the hook.

The hook shown in Figs. 5 and 6 may be used on the device shown in Figs. 1, 2 and 3 as an auxiliary lock or such hook may be used on a signaling device wherein the links 22 and parts associated therewith for moving rods 11 and 11' are dispensed with and the rods are moved by exerting a pull on the knob 21.

This direction indicator may be secured to the dash or windshield of an automobile in any convenient manner and location so that the semaphore 12 projects outwardly from the side of the car far enough to be visible to persons in front of and behind the car. One convenient and satisfactory manner of securing such direction indicator to the car is illustrated in Fig. 3 wherein I have shown a rod 50 that may be secured crosswise of a windshield and that may have the direction indicator adjustably secured thereto by clips 51. It will be understood that a single direction indicator may be used on one side of a car only or that one direction indicator may be provided on each side of the car.

In operation the release mechanism will normally be in the position shown in Fig. 2 and the semaphore 12 will be withdrawn into the tube 11. When it is desired to display the semaphore to indicate that the driver intends to turn the vehicle the hand is placed on the finger piece 30 of the trip lever 28 thereby causing the end of the lever arm 27 to be lifted sufficiently to permit the spring 16 to act and move the rods 11 and 11' outwardly so that the semaphore 12 will open up and be displayed to indicate the direction in which the car is to be turned.

It is obvious that changes in the form of construction and arrangement of parts of this device may be resorted to within the scope of the claims.

What I claim is:—

1. A direction indicator comprising a small tube, a larger tube connected in axial alinement with said smaller tube, a rod extending lengthwise through said tubes, a semaphore on one end of said rod and adapted to project outwardly from the end of said smaller tube, said semaphore being adapted to be normally extended into a signaling position and to be closed by being drawn into the end of said smaller tube, a collar on said rod, a spring in said larger tube arranged to press against said collar to move said semaphore out of said smaller tube, a slidable sleeve on said rod adjacent said knob, limbs pivotally connected with said sleeve, and a forked lever arm fulcrumed on said larger tube and having its forked ends pivotally connected with said limbs whereby the semaphore may be pressed inwardly within the tube in opposition to said spring and releasably secured by the pivotal connection between the limbs and said lever passing beyond the centers of their opposite pivotal connections, respectively.

2. A direction indicator comprising a small tube, a larger tube connected in axial alinement with said smaller tube, a rod extending lengthwise through said tubes, a semaphore on one end of said rod and adapted to project outwardly from the end of said smaller tube, said semaphore being adapted to be normally extended into a signaling position and to be closed by being drawn into the end of said smaller tube, a collar on said rod, a spring in said larger tube arranged to press against said collar to move said semaphore out of said smaller tube, a slidable sleeve on said rod adjacent said knob, limbs pivotally connected with said sleeve, a forked lever arm fulcrumed on said larger tube and having its forked ends pivotally connected with said limbs whereby the semaphore may be pressed inwardly within the tube in opposition to said spring and releasably secured by the pivotal connection between the limbs and said lever passing beyond the centers of their opposite pivotal connections, respectively, and a trip member pivoted on said tube and arranged to be moved to trip said lever arm.

In witness whereof, I hereunto subscribe my name this 24th day of July, A. D. 1919.

HERBERT WILSON.